(12) United States Patent
Lin

(10) Patent No.: US 6,457,247 B1
(45) Date of Patent: Oct. 1, 2002

(54) PROTRACTOR WITH AN AUXILIARY RULER

(75) Inventor: Fu-Chi Lin, Taipei Hsien (TW)

(73) Assignee: Youth Toy Enterprise Co., Ltd. (TW)

( * ) Notice: Subject to any disclaimer, the term of this patent is extended or adjusted under 35 U.S.C. 154(b) by 0 days.

(21) Appl. No.: 09/902,637

(22) Filed: Jul. 12, 2001

(51) Int. Cl.[7] .......................... B43L 13/08; B43L 9/04; G01B 3/56
(52) U.S. Cl. .......................... 33/471; 33/1 N; 33/27.03
(58) Field of Search .......................... 33/27.03, 465, 33/468, 471, 1 AP, 1 N, 534, 538

(56) References Cited

U.S. PATENT DOCUMENTS

| | | | | |
|---|---|---|---|---|
| 346,519 A | * | 8/1886 | Tybjerg | 33/471 |
| 1,576,800 A | * | 3/1926 | Tibony | 33/27.03 |
| 2,042,031 A | * | 5/1936 | Watson | 33/1 N |
| 2,104,515 A | * | 1/1938 | Golden | 33/27.03 |
| 2,612,690 A | * | 10/1952 | Cotton | 33/27.03 |
| 2,857,674 A | * | 10/1958 | Feldhake | 33/27.03 |
| 2,892,586 A | * | 6/1959 | Graham | 33/1 AP |
| 2,904,885 A | * | 9/1959 | Wood, Sr. | 33/1 N |
| 3,263,334 A | * | 8/1966 | Mutter | 33/27.03 |
| 3,693,261 A | * | 9/1972 | Moore | 33/1 AP |
| 5,117,560 A | * | 6/1992 | Nevins | 33/471 |
| 5,205,045 A | * | 4/1993 | Liu | 33/468 |
| 5,408,753 A | * | 4/1995 | Hong | 33/471 |
| 5,588,218 A | * | 12/1996 | Barry et al. | 33/1 N |
| 6,405,443 B1 | * | 6/2002 | Thorn et al. | 33/27.03 |

* cited by examiner

*Primary Examiner*—G. Bradley Bennett
(74) *Attorney, Agent, or Firm*—Michael D. Bednarek; Shaw Pittman LLP

(57) ABSTRACT

A semi-circular protractor is provided at a center of circle with a through hole to which an auxiliary ruler having a length close to a diameter of the protractor is detachably and rotatably attached. With the auxiliary ruler, the protractor may be used to measure angles on a plane and on a three-dimensional body and to draw different angles. The protractor with the auxiliary ruler is designed for children to more easily understand the meaning of "angle" and to learn to use angles.

5 Claims, 7 Drawing Sheets

PROTRACTOR WITH AN AUXILIARY RULER

BACKGROUND OF THE INVENTION

The present invention relates to a protractor with an auxiliary ruler, and more particularly to a protractor having a clear auxiliary ruler detachably and rotatably connected thereto. The auxiliary ruler could be turned relative to the protractor to align an indicating line on the ruler with one of the angle marks on the protractor, so that children could read the degree of an angle being measured or to draw a line corresponding to the measured angle with the help of the auxiliary ruler.

FIG. 1 shows a conventional protractor 10 that is a transparent semi-circular plate provided with marks 101 to indicate 180 degrees of angles. To measure an angle, the protractor 10 is laid on a surface of an angle to be measured with one of the marks 101 aligned with an edge of the angle, so that a degree of the angle could be read from the protractor 10. The conventional protractor 10 of FIG. 1 is not suitable for use when the angle to be measured is on a rather small figure, because the marks 101 are provided along an arced edge of the protractor 10 and would locate beyond an area covering the angle to be measured. A user could only determine an approximate degree of the measured angle according to an invisible line extended from a closest mark 101 toward the center of the circle on the protractor 10. The degree of angle so determined is not perfectly accurate.

Moreover, the conventional protractor 10 of FIG. 1 is only suitable for measuring an angle shown on a plane drawing or on a plane surface of an article, as shown in FIG. 2, and could not be used to measure an angle on a three-dimensional object, such as a polygonal column, a pyramid, etc.

When the conventional protractor 10 is used to draw an angle on a plane, the draftsman needs to make a mark on the drawing to align with a mark 101 on the protractor 10 showing a desired degree of angle, and then draws a line connecting the mark and an origin of measurement to obtain a wanted angle. The conventional protractor 10 is therefore not so convenient in use.

It is therefore tried by the inventor to develop a protractor with an auxiliary ruler that eliminates the drawbacks existing in the conventional protractor and is particularly useful in helping children to quickly and easily measure, draw or read an angle and learn the meaning of angle.

SUMMARY OF THE INVENTION

A primary object of the present invention is to provide a protractor with an auxiliary ruler, wherein the protractor is a semi-circular plate provided at a center of circle with a through hole, so that a clear auxiliary ruler having a length close to a diameter of the protractor is detachably and rotatably connected to the protractor at the through hole. With an indicating line on the auxiliary ruler and degree marks on the protractor, the protractor of the present invention may help children to read an angle of an article being measured or to draw a line indicating an angle corresponding to a mark on the protractor, enabling children to easily understand the meaning of "angle" and to learn to use angles.

Another object of the present invention is to provide a protractor with an auxiliary ruler detachably attached to the protractor, so that the auxiliary ruler could be removed from the protractor for use alone. The auxiliary ruler is provided with a plurality of equally spaced through holes. A user may use two pens along with the separated auxiliary ruler to draw circles and arcs. Children may be guided in such drawing activities to understand meanings of center of circle, radius, diameter, circumference, etc.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
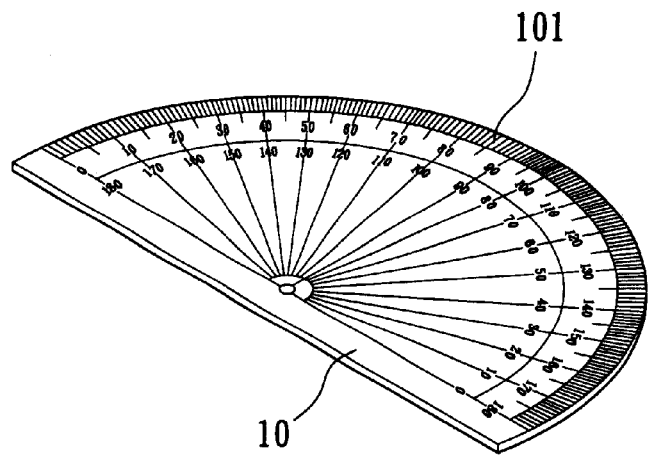
FIG. 1 is a perspective view of a conventional protractor.
Figure 2:
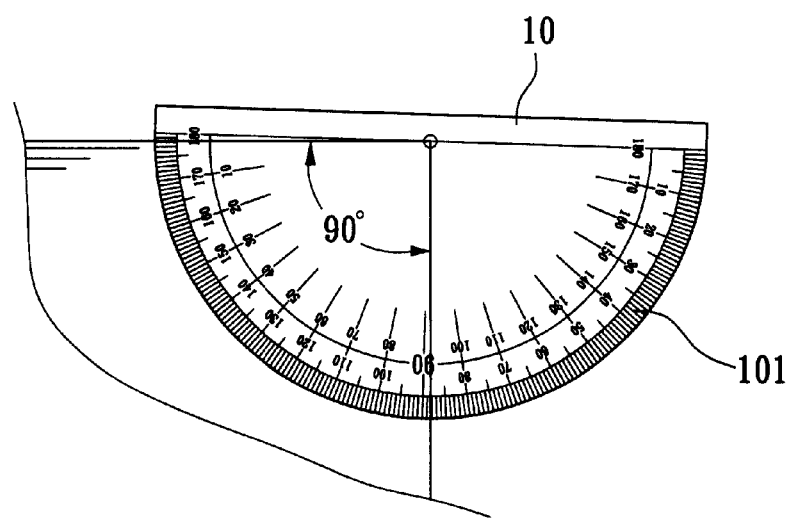
FIG. 2 shows the manner of using a conventional protractor of FIG. 1 to measure an angle.
Figure 3:
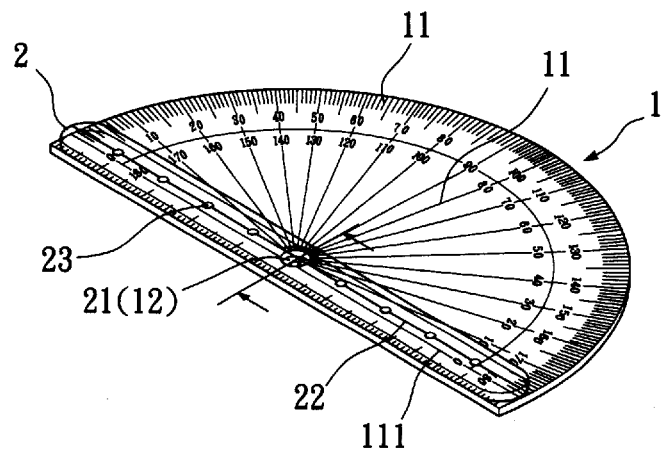
FIG. 3 is an assembled perspective view of a protractor with an auxiliary ruler according to the present invention.

Please refer to FIG. 3 in which a protractor 1 with an auxiliary ruler 2 according to the present invention is shown. The protractor 1 is a semi-circular plate made of a transparent material. Marks 11 showing 180 degrees of angles are provided along an arced edge of the semi-circular protractor 1.

Figure 4:
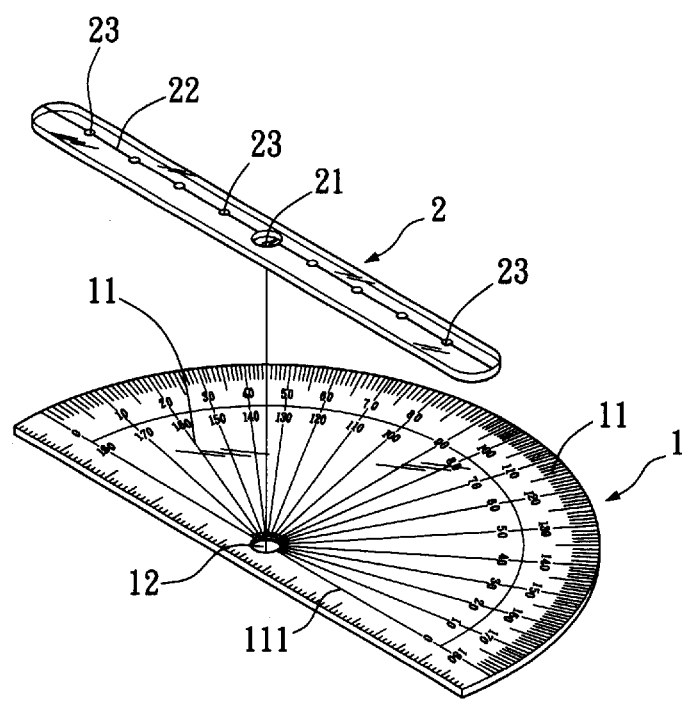
FIG. 4 is an exploded perspective view of the protractor of FIG. 3.

Please refer to FIG. 4. The semi-circular protractor 1 is provided at a center of circle with a stepped through hole 12. A reference line 111 of the marks 11 extended in parallel with a straight bottom edge of the protractor 1 is in a color in contrast to that of other marks 11. The auxiliary ruler 2 is a long strip of clear plate having a length close to and not longer than a diameter of the semi-circular protractor 1. The auxiliary ruler 2 is provided at a bottom center with a downward extended hollow locking shaft 21 for engaging with the stepped through hole 12 on the protractor 1. An indicating line 22 is provided along a central axis of the auxiliary ruler 22 with a plurality of through holes 23 equally spaced along the indicating line 22.

The auxiliary ruler 2 is attached to the semi-circular protractor 1 by engaging the hollow locking shaft 21 with the stepped through hole 12, such that the auxiliary ruler 2 is freely rotatable about the center of circle of the protractor 1. When the protractor 1 is used to measure a certain angle with the auxiliary ruler 2 being turned to align the indicating line 22 with one of the marks 11 to fitly contain the measured angle between the protractor 1 and the auxiliary ruler 2, a correct degree of angle corresponding to the contained angle could be read from the protractor 1.

Figure 5:
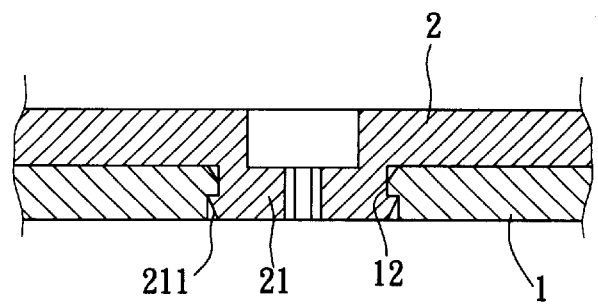
FIG. 5 is a fragmentary, enlarged sectional view of the protractor of the present invention.

As shown in FIG. 5, the hollow locking shaft 21 of the auxiliary ruler 2 is formed around a lower end with a shoulder portion 211 that has an outer diameter larger than that of the hollow locking shaft 21, such that the shoulder portion 211 fitly abuts on a stepped face in the stepped through hole 12 to prevent the hollow locking shaft 21 from easily separating from the through hole 12. Moreover, since the auxiliary ruler 2 has a length close to but not longer than the diameter of the semi-circular protractor 1, it is possible to attach the auxiliary ruler 2 to the protractor 1 in alignment with the straight bottom edge of the protractor 1 without projecting two outer ends of the ruler 2 from the protractor 1. This enables the protractor 1 of the present invention to be conveniently carried for use at any place. As a common practice, the marks 11 on the protractor 1 are usually black lines. In the present invention, the reference line 111 on the protractor 1 and the indicating line 22 on the auxiliary ruler 2 are in a color in contrast to the black color of marks 11, so that the reference line ill and the indicating line 22 could together clearly indicate the degree of an angle contained between them, enabling a user to quickly read the angle or complete the alignment of the indicating line 22 with a mark 11 for measuring purpose.

Figure 6:
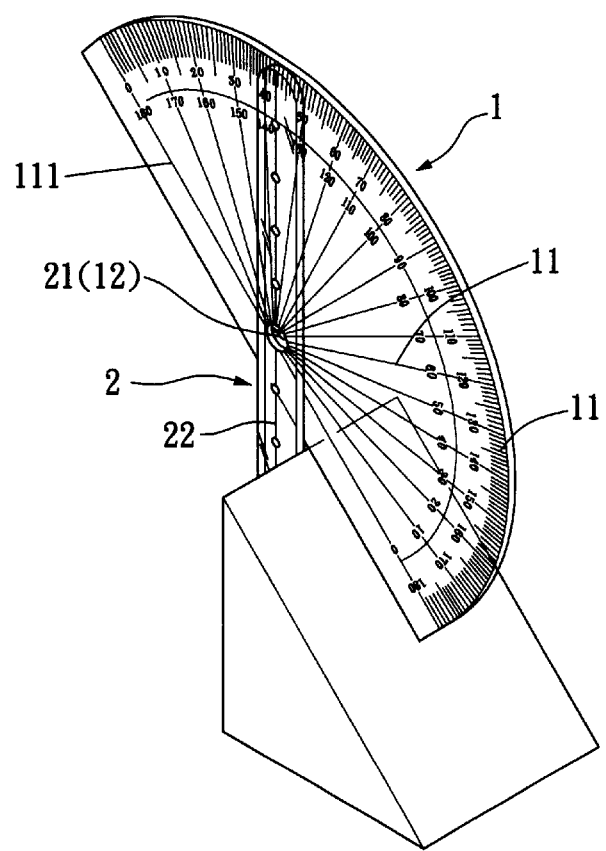
FIG. 6 shows the use of the protractor of the present invention to measure a three-dimensional triangular block.
Figure 7:
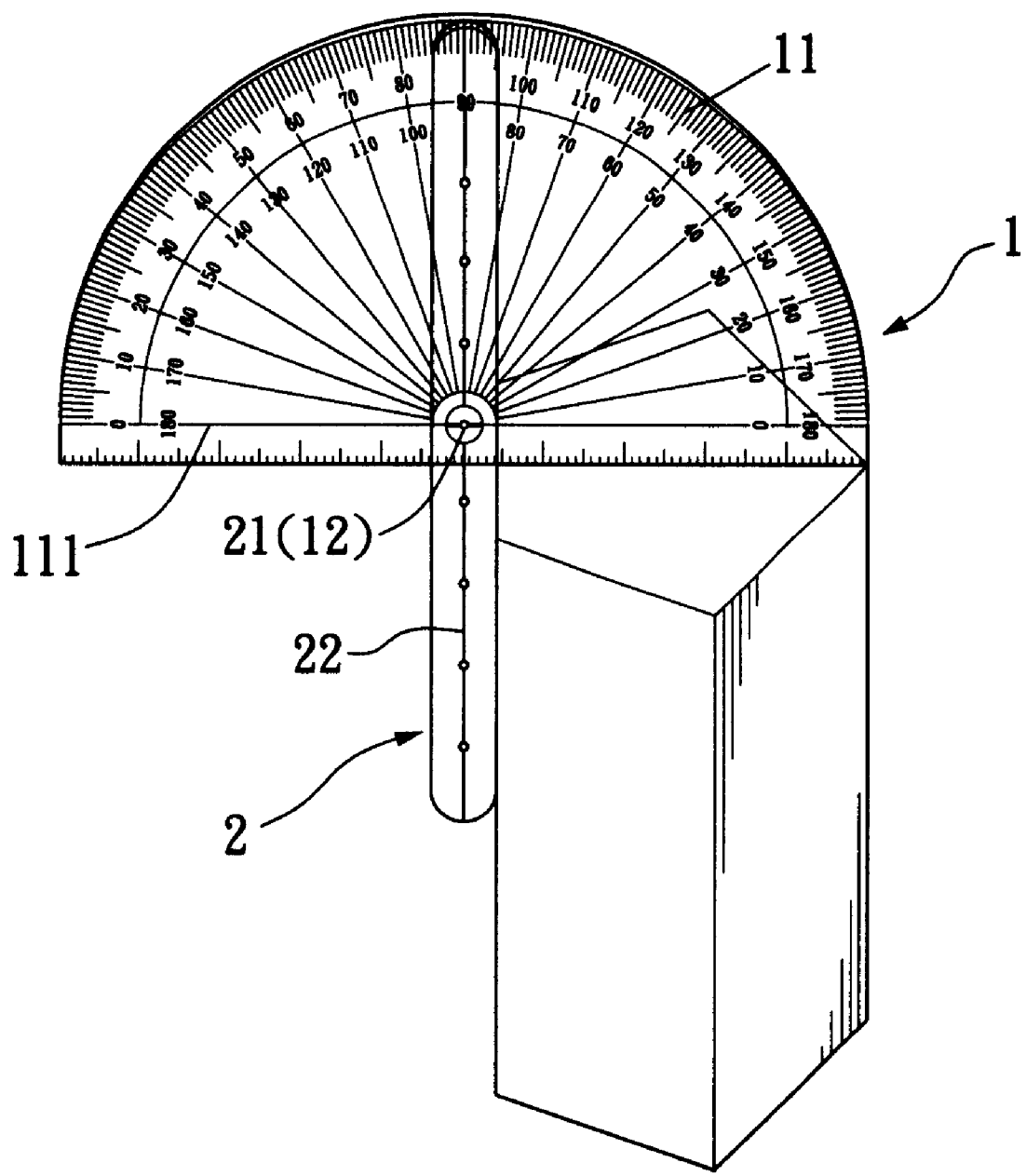
FIG. 7 shows the use of the protractor of the present invention to measure a polygonal column.
Figure 8:
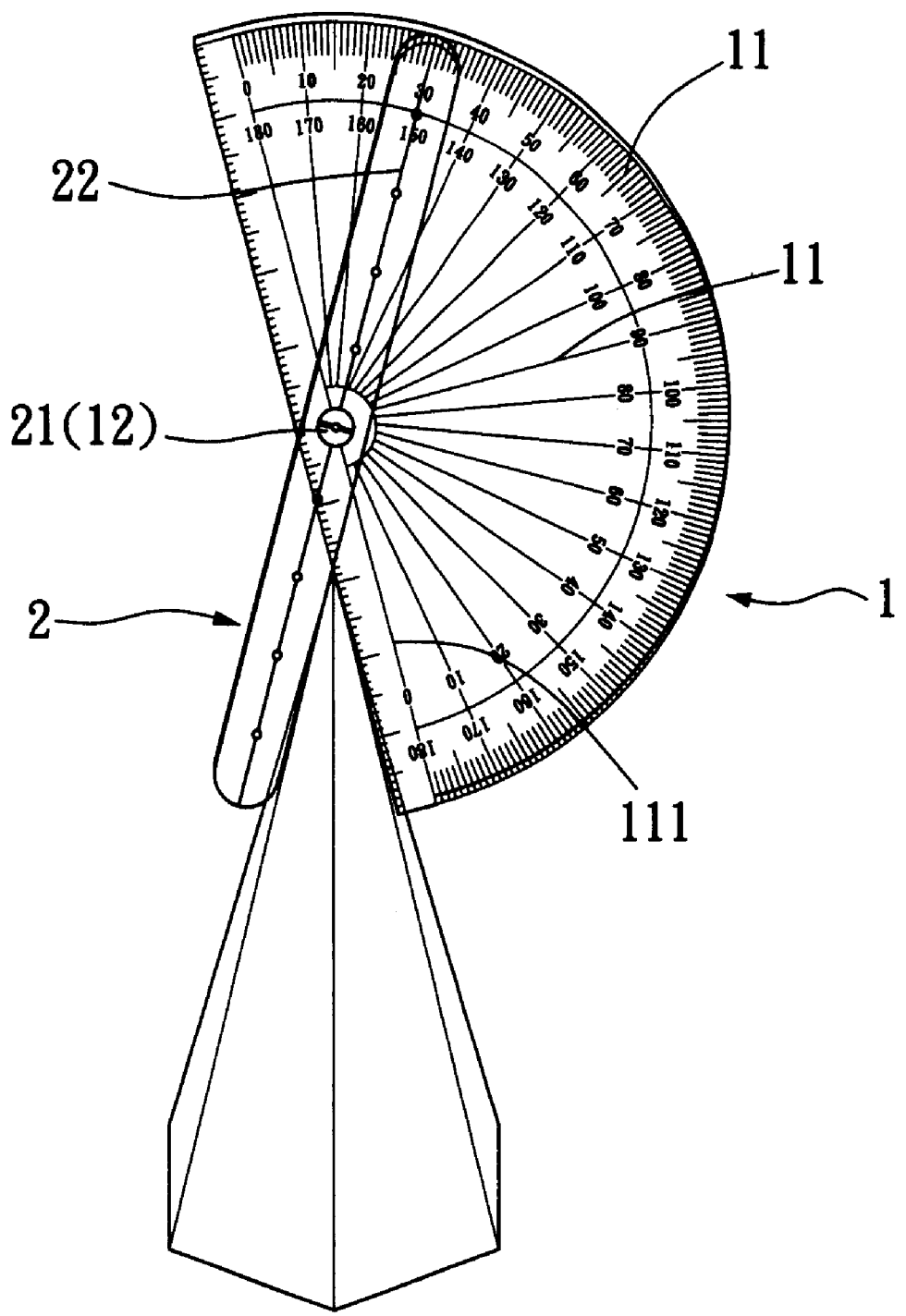
FIG. 8 shows the use of the protractor of the present invention to measure a polygonal pyramid.
Figure 9:
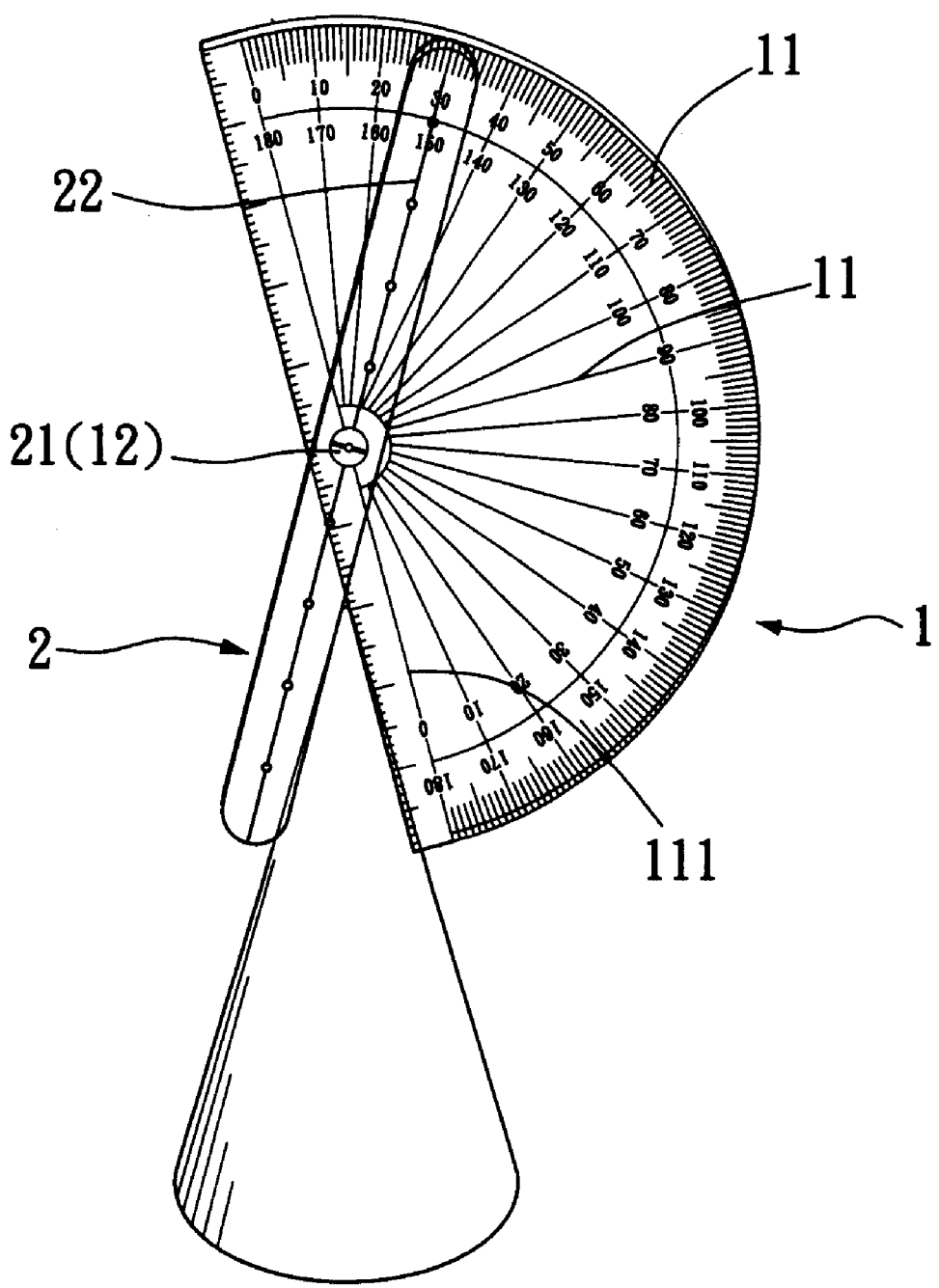
FIG. 9 shows the use of the protractor of the present invention to measure a cone.

The protractor 1 with an auxiliary ruler 2 provided by the present invention may be used to measure or draw an angle not only on a plane but also on a three-dimensional geometrical shape. FIGS. 6 and 7 show that the protractor 1 with the auxiliary ruler 2 is used to measure an angle contained between two sides of a triangular block and a polygonal column, respectively. FIG. 8 and FIG. 9 show that the protractor 1 with the auxiliary ruler 2 is used to measure a top angle of a cone and a pyramid, respectively. Thus, the conventional protractor 10 is not comparable to the protractor 1 of the present invention in terms of scope of application thereof. Thus, the present invention is very useful in helping children to learn about measuring of angles. Through an opening of the auxiliary ruler 2 relative to the protractor 1, children could directly understand the meaning of an angle and compare two different angles to one another.

Figure 10:
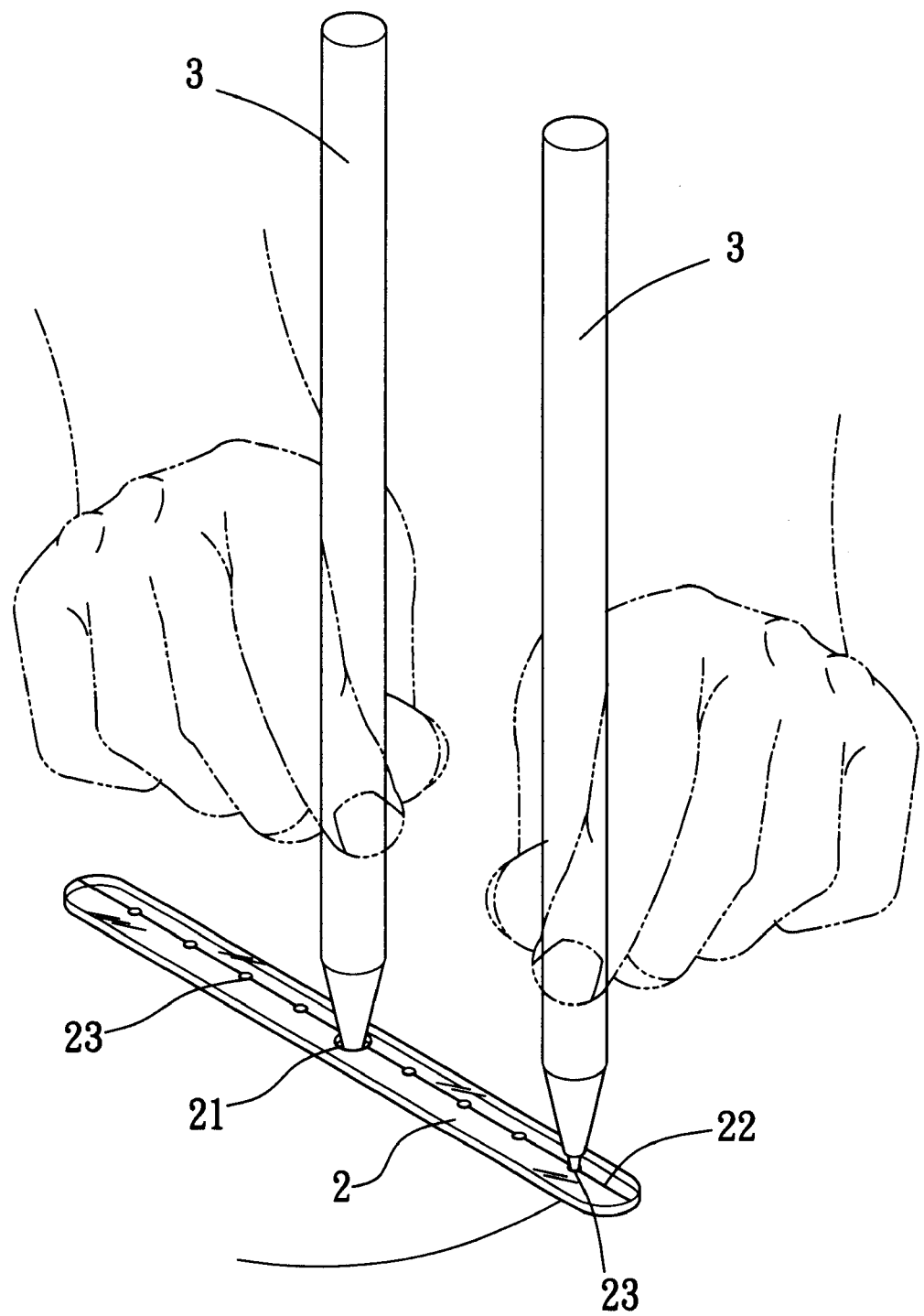
FIG. 10 shows the auxiliary ruler of the protractor of the present invention is used alone to draw a circle or an arc.

The auxiliary ruler 2 could be detached from the protractor 1 for use alone. As shown in FIG. 10, the auxiliary ruler 2 could be used to draw circles or arcs by using the through holes 23 spaced thereon in different manners. For example, a user may select two of the through holes 23 having a desired distance between them. Of course, it is also possible to select the stepped through hole 12 for use. The user may then separately insert, for example, tips of two pens 3 into the selected through holes 23, hold one of the pens 3 in place to serve as a center of circle, and move the other pen 3 about the fixed pen 3 to draw a circle or an arc having a radius equal to the distance between the two selected through holes 23. When children are taught to draw circles and arcs in this way, they could be guided to understand meanings of, for example, center of circle, radius, diameter, circumference, etc.

What is claimed is:

1. A protractor with an auxiliary ruler, comprising a protractor and an auxiliary ruler detachably attached to said protractor;

said protractor being a semi-circular plate made of a transparent material and having an arced edge and a straight bottom edge, marks being provided along said arced edge to indicate 180 degrees of angles, and a stepped through hole being provided at a center of circle of said semi-circular protractor; and said auxiliary ruler being a long strip of clear plate having a length close to and not longer than a diameter of said protractor, said auxiliary ruler being provided at a bottom center with a downward extended hollow locking shaft, and along a central axis with an indicating line; and said auxiliary ruler being attached to said semi-circular protractor by engaging said hollow locking shaft with said stepped through hole, such that said auxiliary ruler is freely rotatable about the center of circle of said protractor;

whereby when said protractor is used to measure an angle with said auxiliary ruler being turned to align said indicating line with one of said marks on said protractor to fitly contain the angle to be measured, a correct degree of angle corresponding to said contained angle could be read from said protractor.

2. The protractor with an auxiliary ruler as claimed in claim 1, wherein said protractor includes a reference line of said marks, said reference line being extended in parallel with said straight bottom edge and in a color in contrast to that for said marks other than said reference line.

3. The protractor with an auxiliary ruler as claimed in claim 1, wherein said auxiliary ruler is provided on said indicating line with a plurality of equally spaced through holes.

4. The protractor with an auxiliary ruler as claimed in claim 1, wherein said auxiliary ruler is detachably attached to said protractor and could be removed from said protractor for use alone to draw circles, arcs or straight lines.

5. The protractor with an auxiliary ruler as claimed in claim 1, wherein said auxiliary ruler is provided around a lower end of said hollow locking shaft with a shoulder portion having an outer diameter larger than that of said hollow lock shaft, and said shoulder portion being adapted to fitly abut on a stepped face of said stepped through hole on said protractor to prevent said auxiliary ruler from easily separating from said protractor.

* * * * *